United States Patent [19]

Jang

[11] Patent Number: 5,825,909
[45] Date of Patent: Oct. 20, 1998

[54] AUTOMATED METHOD AND SYSTEM FOR IMAGE SEGMENTATION IN DIGITAL RADIOGRAPHIC IMAGES

[75] Inventor: Ben Kwei Jang, Rochester, N.Y.

[73] Assignee: Eastman Kodak Company, Rochester, N.Y.

[21] Appl. No.: 608,648

[22] Filed: Feb. 29, 1996

[51] Int. Cl.$^6$ .................................................. G06K 9/00
[52] U.S. Cl. ........................ 382/132; 108/173; 108/225; 108/264
[58] Field of Search ..................................... 382/132, 133, 382/130, 173, 180, 108, 192, 224, 225, 260, 264, 257, 299, 240

[56] References Cited

U.S. PATENT DOCUMENTS

| | | | |
|---|---|---|---|
| 4,731,863 | 3/1988 | Sezan et al. | 382/172 |
| 4,783,751 | 11/1988 | Ehrlich et al. | 382/257 |
| 4,952,805 | 8/1990 | Tanaka | 250/327.2 |
| 5,268,967 | 12/1993 | Jang et al. | 382/132 |
| 5,598,481 | 1/1997 | Nishikawa et al. | 382/132 |

OTHER PUBLICATIONS

"A Survey on Image Segmentation" by K.S. Fu and J.K. Mui. Pattern Recognition, vol. 13, pp. 3–16. Pergamon Press Ltd., 1981.

"Modeling and Segmentation of Noisy and Textured Images Using Gibbs Random Fields" by Haluk Derin and Howard Elliott. IEEE Transactions on Pattern Analysis and Machine Intelligence, vol. PAMI–9, No. 1, Jan. 1987.

"Scale space filtering: a new approach to multi–scale description" by Andrew P. Witkin. From the book, Image Understanding 1984, S. Ullman and W. Richards, Eds., Norwood, NJ, 1984.

"Scale–Space and Edge Detection Using Anisotropic Diffusion" by Pietro Perona and Jitendra Malik. IEEE Trasnactions on Pattern Analysis and Machine Intelligence, vol. 12, No. 7, Jul. 1990, pp. 629–639.

"Effective Algorithms for the Nearest Neighbor Method in the Clustering Problem" by Kazuo Hattori and Yasunobu Torii. Pattern Recognition, vol. 26, No. 5, pp. 741–746, 1993.

Palisson et al., "Unsupervised Multiresolution Texture Segmentation Using Wavelet Decomposition", 1994 IEEE, pp. 625–629.

Primary Examiner—Leo Boudreau
Assistant Examiner—Phuoc Tran
Attorney, Agent, or Firm—David M. Woods

[57] ABSTRACT

An image segmentation method for segmenting various regions of digital radiographic images first uses progressively smoothing techniques to generate smoothed images at multiple scales (resolutions). Next, texture measures are computed at each scale for each pixel in the smoothed image. Then a clustering algorithm is applied to the feature space spanned by the vector of texture measures. A segment spectrum, which is the number of clusters as a function of scale, is subsequently constructed to determine the most stable range of scales and the most stable number of regions into which the image is best segmented. Each pixel in the image is then classified into one of the detected regions according to its belonged cluster in the feature space. Region filling is then performed to eliminate small holes in each segmented region. Finally, a segmented map is generated to function as multivalued templates for any further image processing to be done on various segmented regions of the image.

37 Claims, 4 Drawing Sheets

AUTOMATED METHOD AND SYSTEM FOR IMAGE SEGMENTATION IN DIGITAL RADIOGRAPHIC IMAGES

FIELD OF THE INVENTION

The present invention relates in general to an automated method and system for digital image processing and, more specifically, to an automated method and system for segmenting regions of interest of a digital radiographic image.

BACKGROUND OF THE INVENTION

In medical imaging, accurate diagnosis of disease often depends on the detection of small, low-contrast details within the image. The probability of detection of these details, in turn, depends critically on their visibility in the image. A number of factors, including the human body being imaged, the exposure geometry and technique, and the characteristics of the detector can affect this visibility. In conventional screen/film radiography, the film functions both as a recording medium, converting light from the screen into a latent image that is rendered visible after chemical processing, and as a display medium on a viewbox. Digital radiography, however, eliminates the need for film in the image-recording step. This results in a separation of image acquisition from image display, which, in turn, allows an image or a portion of an image to be displayed at an arbitrary output contrast depending on the particular need. This can be done, for example, by creating a look-up table that maps the digital values of the acquired image into a new set of digital values that will be sent to the display device and written on some output medium. In addition, image processing techniques are often used to enhance various regions in medical images. For example, in the thoracic area of a human body (i.e., as shown in a chest x-ray), edge enhancement techniques are often used to increase the visual contrast of edges, and therefore the conspicuity of certain kinds of structures such as those associated with lung cancer and emphysema.

Another potential advantage of digital radiography is the capability for automatically recognizing anatomical regions of a human body being imaged. For example, in order to successfully recognize lungs in a chest x-ray image, one can first locate the large region covering lungs, trachea, and bronchi, and later decompose the large region into smaller and simpler subregions that can be easily recognizable.

The effectiveness of such image processing techniques depends on the careful choice of the various parameters that control their performance. Furthermore, the variety of exam types and diagnostic needs encountered in medical imaging generally requires that such parameters be chosen based on the image to be processed, rather than based on some fixed characteristics applicable to every image. For example, histogram-based tone-scale transformation is a simple and effective way of adjusting the contrast of an image. However, the histogram is a global characteristic of the image, and therefore does not render robust parameters to distinguish between, say, the low-contrast region of the body being imaged and the region corresponding to collimator blades.

Thus, it is desirable to provide a method to detect and distinguish various regions of a digital radiographic image. Such a method would allow the parameters for various image processing techniques to be calculated more robustly. This in turn will lead to improved quality and better depiction of the information needed for an accurate diagnosis. In the prior art, this process for isolating a region of interest is commonly called segmentation.

Due to the importance of the information obtained from a radiographic image, prior art attempts at segmenting various regions of a digital image are known. Here image segmentation methods are aimed at partitioning an image into physically or anatomically meaningful regions based on geometric or statistical properties of the image. In the description that follows, the term background is used to denote the very high intensity regions of the film, wherein unattenuated radiation energy is absorbed by the film (i.e., the area in which no body portion or object is present). Foreground will be used herein to designate the very low intensity regions of the film, wherein highly absorbent structures (e.g., collimator blades) are used to "frame" the field of irradiation on the film. The anatomical regions, for purposes of illustration only, will be the lungs and mediastinum regions of the thoracic area of the human body.

Prior art attempts at segmenting various regions of a digital image are known. For example, a method disclosed in U.S. Pat. No. 4,731,863 finds intensity thresholds between anatomical structures and image regions based on zero-crossings of a peak detection function derived from application of smoothing and differencing operators to the image histogram. According to this method, the peaks need to be interpretated for each exam type and exposure technique. That is, for one exam type or exposure technique, a low-signal peak could correspond to foreground, but (e.g., for another exam type or exposure technique) it could also correspond to a body portion if no foreground is present in the image. Correspondingly, a high-signal peak may be the image background, or it may be a high-signal body portion (e.g., lungs). Thus, some additional information may be required to complete the analysis.

In U.S. Pat. No. 4,952,805, a foreground finding technique is based on dividing the histogram into several sections with an intensity thresholding procedure. A statistical shape analysis is performed on the section believed to correspond to foreground. A decision about the presence and extent of a foreground region is made based on the shape of this section of the histogram. However, as above, the large variety of histogram shapes that can occur with different exam types and different imaging modalities (e.g., computed tomography (CT), magnetic resonance imaging (MRI), etc.) make this type of analysis subject to error. In addition, since a single threshold is chosen to represent the transition from foreground to object, this method does not perform well when the transition is fairly wide, such as when x-ray scatter is present.

Generally, histogram-based methods work best when the peaks in the histogram corresponding to the foreground/background regions are far enough away from the peaks corresponding to the anatomic regions in the body portion. If the peaks overlap, which can occur if the foreground/background are nonuniform across the image, or if scatter behind the collimator blades causes the signal level to be close to that of the highly x-ray absorbing structures in the body (e.g., the mediastinum region), then it becomes more difficult to separate the foreground/background regions from the regions inside the body portion using histogram-based methods. Moreover, using intensity as the only feature to distinguish among various regions would be expected to perform poorly. This is because anatomical regions of a medical image are often composed of coherent textures, and therefore the intensity alone does not provide sufficient information to make a robust distinction.

A more effective way of segmenting various regions is to include spatial information about the image in the analysis, in addition to the intensity information provided by the histogram. For example, a method described in U.S. Pat. No. 5,268,967 first analyzes the edge content of the image, and then breaks the image into a set of nonoverlapping, contiguous blocks of pixels. The edge density in each block is computed as one indicator of the level of detail or "busyness" in various locations of the image, and, therefore, an indicator of whether these locations are more likely to belong to the foreground, the background, or the body portion. Further analysis of the image and classification into the aforementioned three regions (i.e. background, foreground, or body portion) takes place on a block-by-block basis. More specifically, the information about edge content along with similar information from neighboring blocks is fed into a syntactic reasoning section that uses a set of clinically and empirically determined decision rules to classify each block of the image into one of the aforementioned three regions. A final refinement process is applied to evaluate the fine structure inside each block to ensure the edge pixels of the body portion being imaged are not misclassified. Although this method has proven effective in segmenting the aforementioned foreground, background, and body regions, it has more difficulty in segmenting various regions inside the body portion such as lungs and mediastinum. This happens because the edge density sometimes does not provide sufficient information, and the syntactic reasoning section assumes no region of interest inside the body portion.

Other prior art methods incorporating spatial information into their segmentation processes can be broadly classified into three categories, namely, region-based, edge-based, and pixel-based approaches [See, for example, K. S. Fu and J. K. Mui, "A survey on image segmentation," *Pattern Recognition*, vol. 13, pp. 3–16, 1981]. In a region-based approach, almost all prior art methods (e.g., region merging, region dividing, and a combination of region merging and dividing) use local information heavily. There is no simple way to incorporate global information into the segmentation process unless we severely restrict the type of images we are going to deal with. Moreover, all of the region-based prior art methods process images in an iterative manner and usually involve a great expenditure in computation time and memory. Thus, they are not often suitable for the segmentation of digital radiographic images.

In an edge-based approach, sometimes edges are detected which are not the transition from one region to another, and detected edges often have gaps in them at places where the transitions between regions are not abrupt enough. Therefore, detected edges may not necessarily form a set of connected curves that surround connected regions. As far as the applicability of the edge-based approach to digital radiography is concerned, there are often more than one type of edges (e.g., edges from clavicles, lungs, heart, etc.) inside the body portion of a digital chest radiographic image. So it is very difficult to connect detected edge elements to form closed curves because the information used to connect these edge elements may vary from different exam types. Besides, it is computationally very expensive.

In a pixel-based approach, some prior art methods assume that the distribution of intensity values or other features around a small neighborhood of any pixel can be characterized by stochastic models such as Markov and Gibbs random fields [See, for example, H. Derin and H. Elliott, "Modeling and segmentation of noisy and textured images using Gibbs random fields", *IEEE Trans. Pattern Anal. Machine Intell.*, vol. PAMI-9, no. 1, pp. 39–55, 1987]. Although these methods are mathematically attractive, it has not been proven that the regions of interest in digital radiography are truly fit by any of the existing stochastic models. Some other prior art methods (e.g., A. K. Jain and R. C. Dubes, *Algorithms for Clustering Data,* Englewood Cliffs, N.J.: Prentice Hall, 1988) compute a set of characteristic features or a feature vector for each pixel in the image. It is then expected that pixels in the same region of the image would produce feature vectors that are near to each other, whereas pixels in different regions of the image would produce feature vectors that are far apart in the feature space. A clustering method is then applied to group feature vectors in the feature space into clusters. These clusters are then mapped back to the original spatial domain to produce a segmentation of the image.

Since this approach is based on the assumption that different regions of an image are represented by distinct "modes" in the feature space, the technique will fail if this assumption is not true. Because, in general, the number of regions is not known (e.g., an image with a prosthesis and/or a cast), another drawback is that an unsupervised clustering scheme may not produce the right number of regions. Besides, intensity values and other feature values are generally image dependent and it is not clear how these other feature values should be defined in such a way as to produce good segmentation results.

Furthermore, one problem encountered by all of the aforementioned prior art methods is how to filter out noise while preserving image features, such as edges. The separation between noise and relevant information in many cases depends on the resolution or scale at which the viewer observes the image data. Thus, the problem of filtering cannot be resolved without specifying the level of descriptions desired.

Another related problem encountered by most of the aforementioned prior art methods is that image features are extracted at a single level of resolution or scale. However, an anatomical object contains features of many sizes and the object should be best described at various levels of resolution for a complete description. For example, a coarse scale is required to recognize the general shape of an object, such as the lungs, and a fine scale might be needed to recognize fine features, such as the interstitial disease of the lungs.

To remedy the scale problem, there exists a class of prior art methods that are based on coarse-to-fine resolution for improved processing efficiency and accuracy [e.g., I. Daubechies, *Ten Lectures on Wavelets,* SIAM, 1992; D. Marr, Vision, (Freeman, San Francisco, 1982)]. An image or its descriptors are represented at many levels of scale as a collective representation. Research has recently focused on the issue of how to best construct such a hierarchy of coarse-to-fine images. Representations of this type have been referred to as "pyramids", "multiresolution images", or "scale space images". However, one of the major problems is how to organize features across multiple scales for specific applications. For example, one prior art method (A. P. Witkin, "Scale-space filtering," *Proc. 8th Int. Joint Conf. Artificial Intell.,* Karlsruhe, West Germany, pp. 1019–1021, 1983) provides a basis of feature organization across multiple scales for cleaning one-dimensional (1D) noisy signals. But extending the method to two-dimensional (2D) image signals is very difficult and remains an open problem.

Thus a need remains for an automated method and system for image processing of digital radiographic images to perform image segmentation processing, wherein the various regions of a gray-level image are partitioned and distinguished from each other. Such an automated method and system would allow the parameters of subsequent image processing techniques to be calculated more robustly, leading to better image quality and more accurate diagnosis.

SUMMARY OF THE INVENTION

The foregoing problems in the prior art are overcome according to the present invention, in which the preferred embodiment thereof comprises the steps of:

(a) smoothing the digital radiographic image at a plurality of scales to thereby generate a plurality of smoothed images;

(b) for each smoothed image at each scale, computing two or more texture measures for each pixel;

(c) at each scale, clustering the texture measures in a feature space;

(d) determining the most stable number of clusters in the feature space;

(e) classifying each pixel in the spatial domain based on the determined number of clusters; and (f) generating a segmented map for further image processing.

The technical advantage of the present invention for image segmentation is that it overcomes the foregoing problems associated with the prior art while at the same time:

(a) incorporating spatial information in the segmentation process;

(b) optimally segmenting various regions of interest inside body portion;

(c) processing images in a non-iterative manner;

(d) determining the most stable number of segmented regions without a priori knowledge of noise characteristics; and (e) smoothing noise and extracting features at multiple levels of scale (resolution).

Moreover, there is no need either to compute edges or to connect edges to form closed regions, or to depend on an assumption that the neighborhood of a pixel satisfies certain stochastic model. Furthermore, the complete set of texture measures can be identified that provides sufficient information to segment digital radiographic images.

DESCRIPTION OF THE PREFERRED EMBODIMENTS

Figure 1:
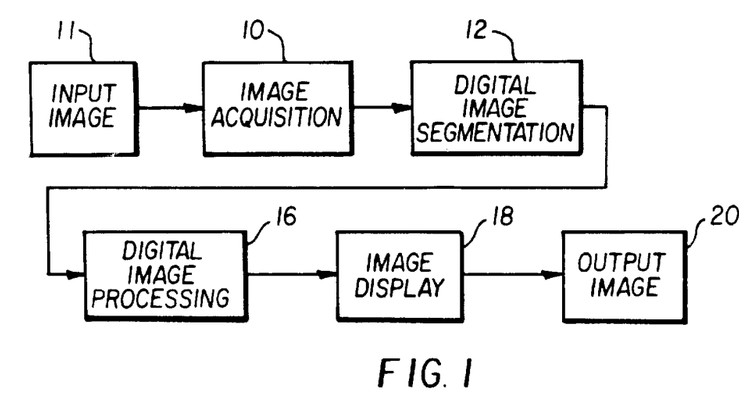
FIG. 1 is a block diagram of an imaging system including the automated system and method of the present invention.
Figure 2:
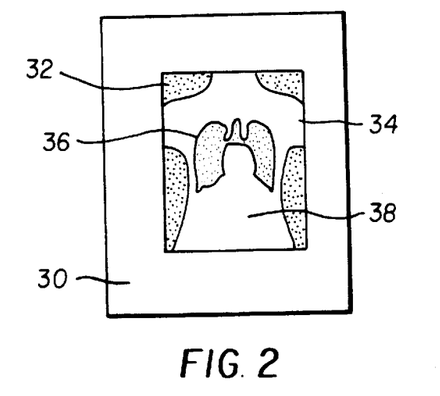
FIG. 2 is schematic diagram illustrating a digital radiographic image containing foreground, background, and a human body portion, wherein the body portion for illustrative purpose only is composed of lungs and mediastinum regions.

Referring to FIG. 1, there is shown a block diagram of an imaging system including the automated method and system of the present invention. The imaging system comprises an image acquisition device 10 for acquiring an input image 11, a digital image segmentation processor 12, a digital image signal processor 16, and an image display device 18 for displaying an output image 20. Although the digital image segmentation processor 12 of the present invention is illustrated as a separate system, it can reside within the digital image processor 16. The digital image signals to be processed utilizing the above-described system can be acquired in a variety of ways. For example, such images are typically derived from storage phosphor (computed radiography) systems, film digitizer systems, image intensifier systems, and the like. Additionally, images acquired via computed tomography (CT) and magnetic resonance imaging (MRI) systems can be utilized. The type of image signal processor 16 utilized in the imaging system will be dependent upon the type of digital image being processed and the ultimate use of the results of the processing. Finally, any number of display devices can be used with the imaging system. For example, the most common display devices 18 are film writers (either laser printers or cathode ray tube (CRT) printers) and CRT soft displays. Additionally, the output image 20 can be captured for permanency on photographic film. FIG. 2 shows a digital radiographic image containing a foreground 30, a background 32, and a body portion 34. The body portion, for illustrative purpose only, is composed of the regions of lungs 36 and mediastinum 38.

Figure 3:
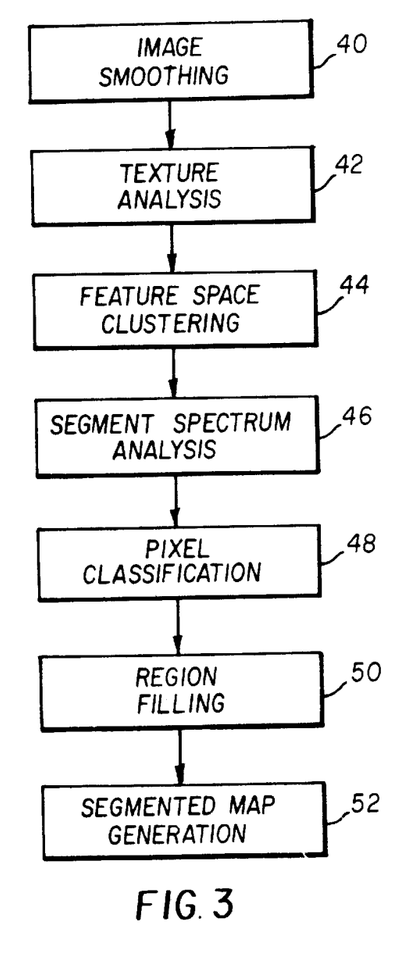
FIG. 3 is a block diagram illustrating the steps of the image segmentation method of the present invention.

In general, as shown in FIG. 3, the digital image segmentation processor 12 performs the method of the present invention, including the following steps: (1) image smoothing 40; (2) texture analysis 42; (3) feature space clustering 44; (4) segment spectrum analysis 46; (5) pixel classification 48; (6) region smoothing 50; and (7) segmented map generation 52. For purposes of illustration only, the operation of the present invention will be described with reference to the digital chest radiographic image, as shown in FIG. 2.

Image Smoothing

The first step in the image segmentation method of the present invention is the step of image smoothing 40, which smooths an image using some smoothing operations. Given a 2D image f(x,y), we assume that the spatial domain of f(x,y), denoted as D, is a subset of the 2D discrete space $Z^2$. We also assume that the range of f(x,y) is a subset of the 1D discrete space Z, in which the intensity value f(x,y) varies discretely. Therefore, the digital image f(x,y) can be expressed by $$f(x,y) \in Z, (x,y) \in D \subseteq Z^2. \tag{1}$$

Figure 4:
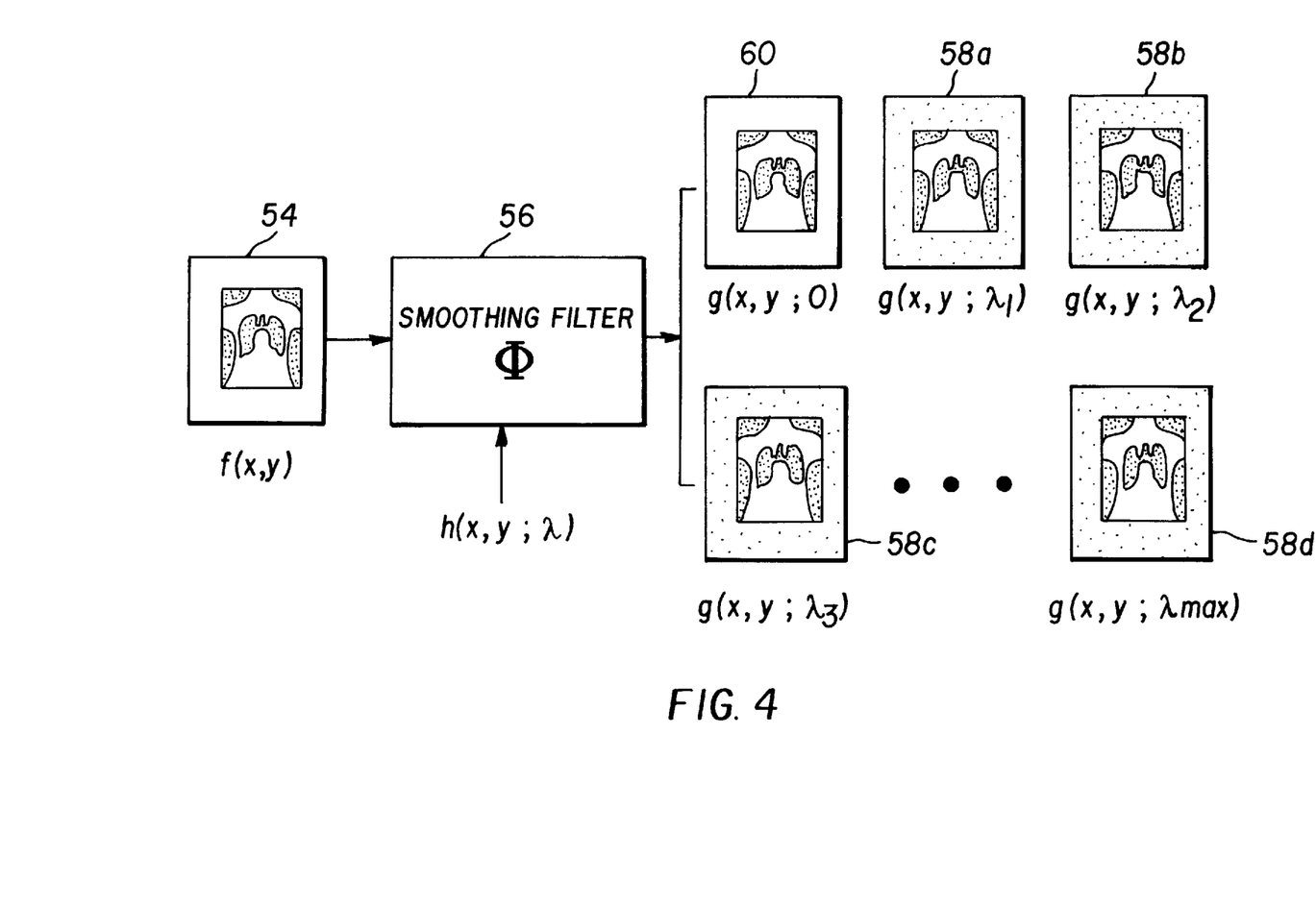
FIG. 4 is a schematic diagram illustrating a radiographic image progressively smoothed by a smoothing filter at multiple scales (resolutions).

As shown in FIG. 4, an image f(x,y) (identified as image 54) is smoothed by a family 56 of smoothing kernels h(x,y;λ) from which a set of smoothed images 58a ... 58d coarser than that of f(x,y) is generated. Precisely, the smoothed image at scale λ is expressed by $$g(x,y;\lambda) = \Phi(f(x,y), h(x,y;\lambda)) \tag{2}$$

where $$g(x,y;\lambda) \in Z, (X,y) \in D \subseteq Z^2, \lambda \geq 0; \quad (3)$$

and the smoothed image $g(x,y;\lambda)$ at $\lambda=0$ (shown as image 60 in FIG. 4) corresponds to the original image, that is, $$g(x,y;0) = f(x,y). \quad (4)$$

The amount of smoothing is determined by proper specification of $\lambda$ of the smoothing kernel $h(x,y;\lambda)$. In general, fine features appear in small $\lambda$ (high resolution) and coarse features in large $\lambda$ (low resolution). The stability of a feature through scale is thus viewed as the persistence to withstand smoothing in the present invention.

The smoothing operation $\Phi$ may be linear or nonlinear. If $\Phi$ is a linear convolution, then the smoothed image can be expressed by $$\begin{aligned} g(x,y;\lambda) &= f(x,y) * h(x,y;\lambda) \\ &= \int_D f(u,v) h(x-u, y-v;\lambda) du dv \end{aligned} \quad (5)$$

where the scale variable $\lambda$ varies from a small to a large value. In the preferred embodiment of the present invention, the smoothing kernel $h(x,y;\lambda)$ can be a Gaussian function defined by $$h_G(x,y;\lambda) = \frac{1}{2\pi\lambda^2} e^{-(x^2+y^2)/2\lambda^2} \quad (6)$$

or a so-called Mexican hat function defined by $$h_M(x,y;\lambda) = \frac{1}{\lambda} \left(1 - \left(\frac{x}{\lambda}\right)^2\right) \left(1 - \left(\frac{y}{\lambda}\right)^2\right) e^{-(x^2+y^2)/2\lambda^2} \quad (7)$$

with $\lambda$ ranging from 0 to $\lambda_{max}$, the width of the discrete image domain D. It is to be noted that if the smoothing kernel is a Mexican hat function, then the smoothing operation $\Phi$ becomes the wavelet transform (see I. Daubechies, *Ten Lectures on Wavelets,* SIAM, 1992). Other well-known nonlinear operations such as median filters, rank-order filters, stack filters, and morphological filters may be applicable in this step. In addition, anisotropic diffusion filters (see P. Perona and J. Malik, "Scale-space and edge detection using anisotropic diffusion," *IEEE Trans. Pattern Anal. Machine Intell.,* vol. PAMI-12, pp. 629–639, 1990) may also be applicable in this step.

Texture Analysis

Figure 5:
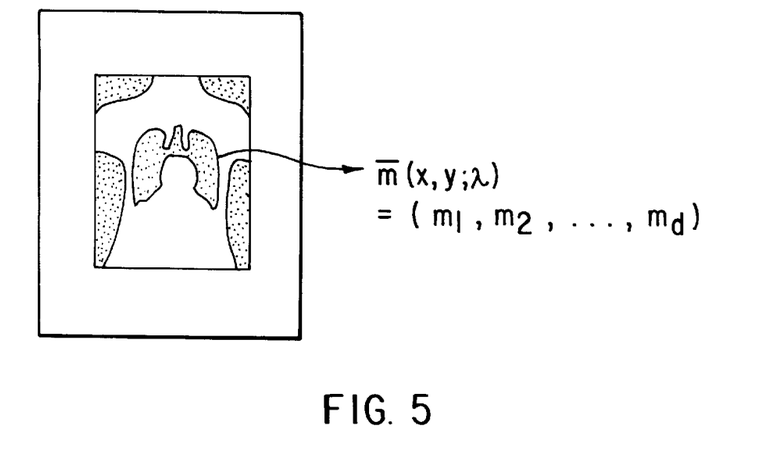
FIG. 5 is a schematic diagram illustrating the texture analysis step of the image segmentation method in the present invention.

The next step in the image segmentation method of the present invention is the step of texture analysis 42 of the smoothed images $g(x,y;\lambda)$ at multiple scales. The objective is to compute a set of texture measures or a texture vector for each pixel in the smoothed images. Although using intensity values alone may segment some types of regions in digital radiographic images, it does not provide acceptable segmentation results in general. Besides, in medical imaging, pixels which are spatially close are likely to be of the same texture except for those around edges. Therefore, an intuitive approach is to calculate a set of texture measures or a texture vector at each pixel of the smoothed image. As shown in FIG. 5, the texture vector $\overline{m}(x,y;\lambda)$ is composed of d texture measures computed at the pixel (x,y) of the smoothed image at the scale $\lambda$. This would be able to increase the level of information extracted from images and to also quantify region differences inaccessible to intensity value.

As there have been many texture measures available, it is important to choose a small number of d such that the optimal segmentation result can be obtained in the sense of segmentation correctness and efficiency. For the image segmentation method disclosed in the present invention, it is experimentally shown that the set of eight texture measures, $M=(m_i, 1 \leq i \leq 8)$ as listed in Appendix 1, provides the optimal segmentation results for digital radiographic images. Moreover, if the exam type of the input image is given a priori, one could further reduce the number of texture measures to achieve the same quality of segmentation results.

Feature Space Clustering

Figure 6:
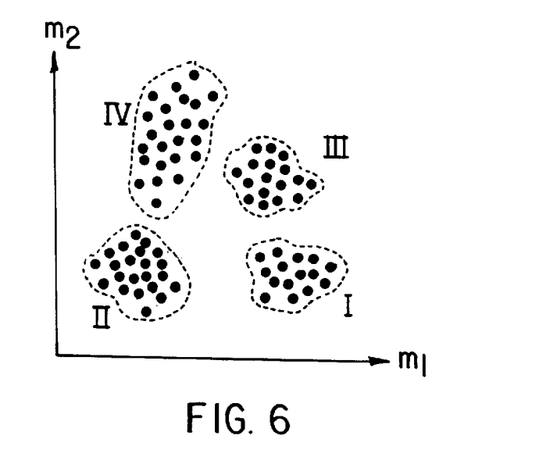
FIG. 6 is a schematic diagram illustrating the feature space clustering step of the image segmentation method in the present invention.

The next step in the image segmentation method of the present invention is the step of feature space clustering 44. The feature space is constituted by a d-dimensional (d=8) space in which each pixel in the smoothed image $g(x,y;\lambda)$ is represented by a texture vector $\overline{m}(x,y;\lambda)=(m_1(x,y;\lambda), m_2(x,y;\lambda), \ldots, m_8(x,y;\lambda))$. Here $(m_i(x,y;\lambda))$ is the ith texture measure computed for the pixel (x,y) at the scale $\lambda$. If all the pixels in one spatial region had the same texture measures, there would be only a single point observed in the feature space. In real cases it is expected that all the pixels in one spatial region form a cluster of points in the feature space. The clustering problem is then to find separating surfaces in d dimensions which will partition the feature space into $K(\lambda)$ mutually exclusive regions. Many supervised clustering algorithms are available and effective when the number of clusters into which a data set should be classified is known. However, in reality, the number of clusters to be obtained is not known or cannot be certain in advance. In the preferred embodiment of the present invention, an unsupervised algorithm described in Hattori (K. Hattori and Y. Torii, "Effective algorithms for nearest neighbor method in the clustering problem," *Pattern Recognition,* vol. 26, no. 5, pp. 741–746, 1993), which does not need the number of clusters a priori, is applied. This algorithm has been tested in the present invention and confirmed to be effective in clustering the feature space for digital radiographic images. For illustrative purpose only, FIG. 6 gives an example of 2D feature space $(m_1, m_2)$ in which four clusters are separated for the smoothed image $g(x,y;\lambda)$ shown in FIG. 5. It is to be noted that the number of clusters is dependent upon the scale $\lambda$ at which we observe the data. Moreover, we can further remove features not contributing to good clustering and hence reduce the dimensionality for clustering the feature space.

Segment Spectrum Analysis

Figure 7:
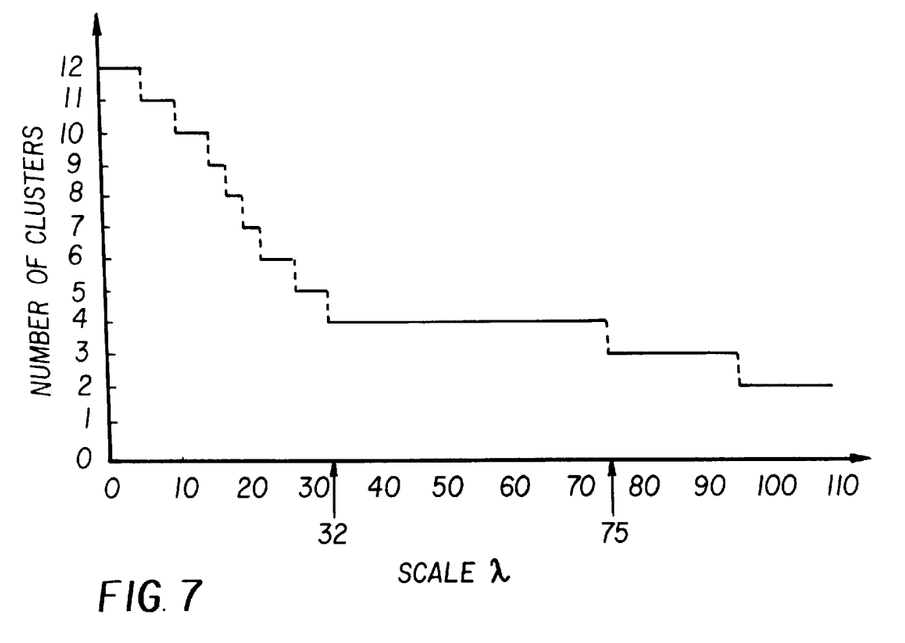
FIG. 7 is a schematic diagram illustrating the segment spectrum analysis step of the image segmentation method in the present invention, wherein the segment spectrum is used to determine the most stable range of scales and the most stable number of regions in a radiographic image.

The number of clusters computed at the previous step often varies at different scales. For example, the number of clusters increases as the scale is decreased since much more detailed information including noise can be observed at finer scales (higher resolutions). The following step in the image segmentation method of the present invention is the step of segment spectrum analysis 46, from which we determine the most stable number of regions (i.e., segments in a radiographic image) and the most stable range of scales to segment an image. The number of clusters, as computed at each scale from the previous step, is used to construct the segment spectrum—the number of clusters in the feature space as a function of scale. With discrete increment of $\lambda$, the segment spectrum is a discrete function where the most frequent count is determined by a continuum of the broadest constant spectrum. Mathematically, the most frequent count, N*, is expressed as $$N^* = \arg\max_{N \in Z^+} \{\lambda''_{NM} - \lambda'_N | K(\lambda)=N, \text{ for } \lambda'_N \leq \lambda \leq \lambda''_N\} \quad (8)$$

where $Z^+$ is the set of positive integers, and $\lambda'_N$ and $\lambda''_N$ denote the range of a constant spectrum, that is, the range of scales in which the number of clusters is equal to N. The chest radiographic image in FIG. 2 is used to construct the segment spectrum shown in FIG. 7, where the most stable scales ranges from $\lambda'_{N^*}=32$ to $\lambda''_{N^*}=75$; and the most stable number of regions N* is found to be equal to 4, which is the most frequent cluster count (N*=4) represented by the continuum of the broadest constant spectrum.

Pixel Classification

The next step of the method in the present invention is the step of pixel classification 48. After progressive smoothing and texture analysis up to the scale $\lambda'_{N^*}$, the image f(x,y) is detected to have N* stable regions, where $\lambda'_{N^*}$ is the lower bound of the bandwidth that spans the broadest constant spectrum $[\lambda'_{N^*}, \lambda''_{N^*}]$. The lower bound is chosen because within the bandwidth, $g(x,y; \lambda'_{N^*})$ is the closest to f(x,y) in the sense of minimum mean square error. Therefore, a pixel in the spatial domain is classified into the kth ($1 \leq k \leq K$ ($\lambda'_{N^*}$)) region when its associated texture vector $\overline{m}(x,y; \lambda'_{N^*})$ belongs to the kth cluster obtained from the step of feature space clustering.

Region Filling

Ideally, there is no hole inside any anatomical region derived from the previous step. However, due to the possible distribution of irregular textures in a region (e.g., diseases in the region of lungs) and the imperfectness of feature space clustering, there may exist small holes in the segmented regions derived from the previous step. Therefore, the next step of the image segmentation method is region filling in which holes are filled in for the above segmented regions. A simple and efficient algorithm used to implement this step is provided in Appendix 2.

Segmented Map Generation

Figure 8:
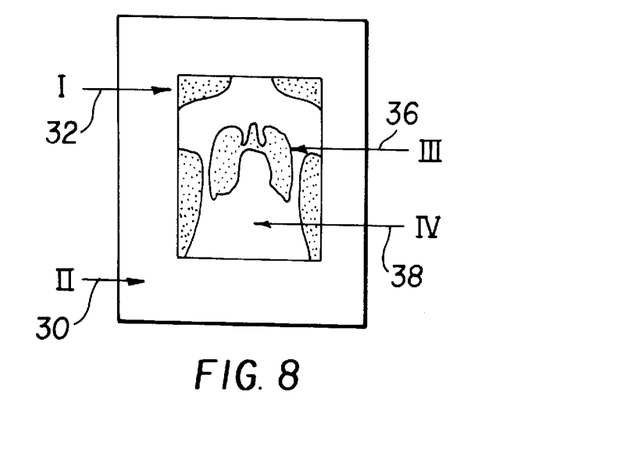
FIG. 8 is a schematic diagram illustrating the segmented map generation step of the image segmentation method in the present invention.

In the last step of the method, the segmented map generation step 52, an N*-valued image is generated that functions as N* templates for any further image processing to be done on various regions of the image. FIG. 8 illustrates an example where the input image as shown in FIG. 2 is segmented into the most stable four regions I–IV; namely, the background 32, the foreground 30, the lungs 36, and the mediastinum 38, where the regions I–IV correspond to the clusters I–IV shown in FIG. 6 (in feature space) for the feature continuum of broadest constant spectrum (FIG. 7). As a result, if a histogram of the lung region is required, only those pixels with the correct value in the N*-valued image are included in the calculation. If edge enhancement is being performed, pixels in the undesired regions (e.g., foreground/background) are not included in the calculation of enhancement parameters. In this way, only the relevant information in the image is included in subsequent image processing of the image, leading to images with high quality and high diagnostic utility.

The image segmentation method of the present invention has been tested on a large set of clinical data (more than 1000 images) obtained from a digital radiographic system; namely, KODAK EKTASCAN IMAGELINK Critical Care System (KEICCS) in which a storage phosphor reader is used as the image acquisition device. The original images were acquired at a resolution of 2048 pixels/line and 2500 lines and 12 bits/pixel. In order to make the image segmentation method of the present invention more efficient, the images were subsampled by a factor of 9 in both directions, resulting in images 227 pixels by 277 pixels in size. The image size of the subsampled image chosen for the preferred embodiment of the present invention was based on a series of tests with image sizes ranging from full resolution (2048×2500) to 64 ×78. The quality of the results was not affected by image size until the smallest sizes were reached (subsampling factors greater than approximately 16).

Although a preferred embodiment of the present invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

APPENDICES

Appendix 6.1: Texture Measures

In our study on the texture analysis of digital radiographic images, the following eight texture measures are observed to be effective in classifying various regions of interest. These measures are computed over a well-defined region R of the input image f(x,y),(x,y) E D with R being a subset of D. In the preferred embodiment of the present invention, R is a 51×51 square region for a full resolution image, and 5×5 for a subsampled image. Of course, the region R can be also defined as a function of scale that we use to observe the data. For example, $$R(\lambda) = 5 + \lambda \left( \frac{51-5}{\lambda_{max}} \right). \tag{19}$$

To formulate the measures in a concise way, we denote the number of pixels and the maximal intensity value in R by $N_R$ and $G_R$, respectively. We further define $$p(i) = \frac{1}{N_R} \cdot (\text{Number of pixels with} \tag{20}$$

$$f(x,y) = i, (x,y) \; R)$$

$$p(i,j) = \frac{1}{N_R} \cdot (\text{Number of pixels with} \tag{21}$$

$$f(x_1,y_1) = i, f(x_2,y_2) = j, (x_1,y_1),(x_2,y_2) \; R)$$

and $$p'(i) = \frac{1}{N_{R2}} \cdot (\text{Number of pixels with} \tag{22}$$

$$|f(x_1,y_1) - f(x_2,y_2)| = i, (x_1,y_1),(x_2,y_2) \; R),$$

where $$\sum_{i=0}^{G_R} p(i) = 1, \sum_{i=0}^{G_R}\sum_{j=0}^{G_R} p(i,j) = 1, \sum_{i=0}^{G_R} p'(i) = 1. \tag{23}$$

Then the eight texture measures are defined in the following:

$$m_1 = \sum_{i=0}^{G_R} i \cdot p(i) \tag{24}$$

$$m_2 = \sum_{i=0}^{G_R} i^2 \cdot p(i) - m_1^2, \tag{25}$$

$$m_3 = \sum_{i=0}^{G_R}\sum_{j=0}^{G_R} P(i,j)^2, \tag{26}$$

$$m_4 = \sum_{i=0}^{G_R}\sum_{j=0}^{G_R} (-p(i,j) \cdot \log p(i,j)), \tag{27}$$

$$m_5 = \sum_{i=0}^{G_R}\sum_{j=0}^{G_R} \frac{1}{1 + (k-l)^2} \cdot p(i,j), \tag{28}$$

$$m_6 = \sum_{i=0}^{G_R} i \cdot p'(i), \tag{29}$$

-continued $$m_7 = \sum_{i=0}^{G_R} i^2 \cdot p'(i), \quad (30)$$

$$m_8 = \sum_{i=0}^{G_R} (-p'(i) \cdot \log p'(i)). \quad (31)$$

Appendix 2

An Algorithm to Fill Holes inside a Region

INPUT: (S)

OUTPUT: (S')

Step 1: Set G to be a set containing pixels of the first row, the first column, the last row, and the last column of the input image; Set H to be $S^c$ (the set complement of S); set A to be a 3×3 square structuring element Step 2: If H\G=∅, then S'=H$^c$; STOP, otherwise Step 3: Arbitrarily select a pixel x∈H\G; set E:={x}

Step 4: D:=(E⊕A)∩H

Step 5: If D=E and D∩G=∅, then H=H\D; repeat from Step 2, otherwise

Step 6: If D=E and D∩G≠∅, then G=G∪D; repeat from Step 2, otherwise

Step 7: E:=D; repeat from Step 4.

What we claim is:

1. A method for segmenting a digital radiographic image into a plurality of regions in a spatial domain, said method comprising the steps of:
   (a) smoothing the digital radiographic image at a plurality of scales to thereby generate a plurality of smoothed images;
   (b) computing two or more texture measures for each pixel from each smoothed image at each scale;
   (c) at each scale, clustering the texture measures in a feature space;
   (d) determining the most stable number of clusters in the feature space;
   (e) classifying each pixel in the spatial domain based on the determined number of clusters; and
   (f) generating a segmented map for further image processing.

2. The method of claim 1 wherein the regions of the radiographic image are physically or anatomically meaningful regions.

3. The method of claim 1 wherein the step of smoothing a digital image at a plurality of scales includes the use of linear progressively smoothing techniques.

4. The method of claim 3 wherein the use of a linear smoothing technique includes the use of a Gaussian smoothing kernel.

5. The method of claim 3 wherein the use of a linear smoothing technique includes the use of a Mexican hat smoothing kernel.

6. The method of claim 5 wherein the use of a Mexican hat smoothing kernel is related to a wavelet transform.

7. The method of claim 1 wherein the step of smoothing a digital image at a plurality of scales includes the use of nonlinear progressively smoothing techniques.

8. The method of claim 1 wherein a texture vector comprises a set of texture measures that are selected to provide information for segmenting the plurality of regions of the radiographic image.

9. The method of claim 1 wherein the feature space is constituted of an n-dimensional space in which each point represents an n-element texture vector.

10. The method of claim 9 further including the step of determining the exam type of the input image, wherein the dimensionality of the feature space is thereby reduced.

11. The method of claim 1 wherein the step of clustering in the feature space includes the use of an unsupervised algorithm which does not require specification of the number of clusters a priori.

12. The method of claim 1 wherein the step of determining the most stable number of clusters includes the construction of a segment spectrum according to the number of clusters computed in the feature space as a function of scale.

13. The method of claim 12 wherein the most stable number of clusters in the feature space is determined by the continuum of the broadest constant spectrum.

14. The method of claim 12 wherein a stable range of scales is determined by the range of the broadest constant spectrum.

15. The method of claim 12 wherein the step of classifying each pixel in the spatial domain includes the use of the lower bound of the broadest constant spectrum.

16. The method of claim 1 wherein the step of generating a segmented map includes the use of a multiple-valued image that functions as multiple templates for any further image processing to be done on the segmented regions of the image.

17. A method for segmenting a digital radiographic image into a plurality of regions in a spatial domain, said method comprising the steps of:
   (a) smoothing the digital radiographic image at a plurality of scales to generate a plurality of smoothed images;
   (b) at each scale, computing a set of texture measures chacterized by a texture vector for each pixel in each smoothed image;
   (c) at each scale, clustering the texture vectors in a feature space;
   (d) generating a segment spectrum relating the number of clusters to the scale;
   (e) analyzing the segment spectrum to determine the most stable range of scales and the most stable number of clusters in the feature space;
   (e) classifying each pixel in the spatial domain based on the determined range of scales and the determined number of clusters; and
   (f) generating a segmented map for further image processing.

18. The method as claimed in claim 17 further including the step of eliminating small holes in each segmented region before generating a segmented map.

19. The method of claim 17 wherein the step of smoothing a digital image at a plurality of scales includes the use of linear progressively smoothing techniques.

20. The method of claim 19 wherein the use of a linear smoothing technique includes the use of a Gaussian smoothing kernel.

21. The method of claim 19 wherein the use of a linear smoothing technique includes the use of a Mexican hat smoothing kernel.

22. The method of claim 21 wherein the use of a Mexican hat smoothing kernel is related to a wavelet transform.

23. The method of claim 17 wherein the step of smoothing a digital image at a plurality of scales includes the use of nonlinear progressively smoothing techniques.

24. The method of claim 17 wherein a texture vector comprises a set of texture measures that are selected to provide information for segmenting the plurality of regions of the radiographic image.

25. The method of claim 17 wherein the feature space is constituted of an n-dimensional space in which each point represents an n-element texture vector.

26. The method of claim 17 wherein the step of clustering in the feature space includes the use of an unsupervised algorithm which does not require specification of the number of clusters a priori.

27. The method of claim 17 wherein the most stable number of clusters in the feature space is determined by the continuum of the broadest constant spectrum.

28. The method of claim 17 wherein the most stable range of scales is determined by the range of the broadest constant spectrum.

29. The method of claim 27 wherein the step of classifying each pixel in the spatial domain includes the use of the lower bound of the broadest constant spectrum.

30. A system for segmenting a digital radiographic image into a plurality of regions in a spatial domain, said system comprising:

(a) means for smoothing the digital radiographic image at a plurality of scales to thereby generate a plurality of smoothed images;

(b) means for computing two or more texture measures for each pixel from each smoothed image at each scale;

(c) means, operative at each scale, for clustering the texture measures in a feature space;

(d) means for determining the most stable number of clusters in the feature space;

(e) means for classifying each pixel in the spatial domain based on the determined number of clusters; and (f) means for generating a segmented map for further image processing.

31. The system of claim 30 wherein said means for smoothing a digital image at a plurality of scales includes the use of linear progressively smoothing techniques.

32. The system of claim 30 wherein said means for smoothing a digital image at a plurality of scales includes the use of nonlinear progressively smoothing techniques.

33. The system of claim 30 wherein said means for clustering in the feature space includes the use of an unsupervised algorithm which does not require specification of the number of clusters a priori.

34. The system of claim 30 wherein said means for determining the most stable number of clusters includes means for generating a segment spectrum describing the number of clusters in the feature space as a function of scale.

35. The system of claim 34 wherein the most stable number of clusters in the feature space is determined by the continuum of the broadest constant spectrum.

36. The system of claim 30 wherein the radiographic image is a subsampled image.

37. The system of claim 30 wherein the radiographic image is a non-subsampled image.

* * * * *